United States Patent
Lordi et al.

(10) Patent No.: US 10,636,533 B2
(45) Date of Patent: Apr. 28, 2020

(54) ALLOYS FOR INERT MATRIX FUEL COMPOSITIONS, AND METHODS OF MAKING THE SAME

(71) Applicant: Lawrence Livermore National Security, LLC, Livermore, CA (US)

(72) Inventors: Vincenzo Lordi, Livermore, CA (US); Patrice Erne A. Turchi, Menlo Park, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 568 days.

(21) Appl. No.: 15/348,885

(22) Filed: Nov. 10, 2016

(65) Prior Publication Data

US 2018/0130562 A1    May 10, 2018

(51) Int. Cl.
| | | |
|---|---|---|
| G21C 21/02 | (2006.01) | |
| C22C 16/00 | (2006.01) | |
| G21C 3/20 | (2006.01) | |
| G21C 3/28 | (2006.01) | |
| G21C 3/60 | (2006.01) | |

(52) U.S. Cl.
CPC .............. *G21C 21/02* (2013.01); *C22C 16/00* (2013.01); *G21C 3/20* (2013.01); *G21C 3/28* (2013.01); *G21C 3/60* (2013.01); *Y02E 30/38* (2013.01)

(58) Field of Classification Search
None
See application file for complete search history.

(56) References Cited

PUBLICATIONS

Polsiapa et al. "Reheat Treated Microstructures and Gamma Prime Particle Coarsening at 900° C. of Cast Nickel Based Superalloy In-738" Journal of Metals, Materials, and Minerals, vol. 16, No. 2, 2006, pp. 7-13 (Year: 2006).*
Savchenko et al., "New concept of designing Pu and MA containing fuel for fast reactors", J. of Nuclear Materials, vol. 385, 2009, pp. 148-152.
Savchenko et al., "New Concept of Designing Composite Fuel for Fast Reactors with Closing Fuel Cycle," International Atomic Energy Agency, 2013, pp. 1-11.
Savchenko et al., "Cermet and Metmet Fuel with Zirconium Matrix Alloys," All-Russia Research Institute of Inorganic Materials, 2010, pp. 1-16.
Savchenko et al., "Fuel of novel generation for PWR and as alternative to MOX fuel," Energy Conversion and Management, vol. 51, 2010, pp. 1826-1833.

(Continued)

*Primary Examiner* — Peter F Godenschwager
(74) *Attorney, Agent, or Firm* — Zilka-Kotab

(57) ABSTRACT

In one embodiment, an alloy includes: Zr; Fe; Cu; Ta in an amount from about 1 wt % to about 3 wt %; and one or more optional constituents selected from: Ti, Be, and Nb; and wherein the alloy comprises a ductile phase and a nanoprecipitate hard phase. According to another embodiment, a method of forming an inert matrix nuclear fuel includes: packing a hollow structure with fuel pellets and alloy precursor pellets; heating the fuel pellets and the alloy precursor pellets to at least a melting temperature of an alloy to be formed by melting the alloy precursor pellets; and solidifying the alloy into a matrix surrounding the fuel pellets. The alloy precursor pellets independently comprise: Zr; Fe; Cu; Ta present in an amount from about 1 to about 3 wt %; and one or more optional alloy constituents selected from: Ti, Be, and Nb.

20 Claims, 9 Drawing Sheets

(56) References Cited

PUBLICATIONS

Savchenko et al., "Inert matrix fuel with low melting point zirconium brazing alloys," Journal of Nuclear Materials, vol. 352, 2006, pp. 334-340.
Savchenko et al., "Peculiarities of fuel cycle with advanced composite fuel for thermal reactors," Progress in Nuclear Energy, vol. 72, 2014, pp. 119-125.
Savchenko et al., "Dispersion type zirconium matrix fuels fabricated by capillary impregnation method," Journal of Nuclear Materials, vol. 362, 2007, pp. 356-363.
Savchenko et al., "Zirconium alloys matrix as innovative material for composite fuel," Progress in Nuclear Energy, vol. 57, 2012, pp. 138-144.
Lordi et al., "Alloy Optimization for Metallic Inert Matrix Nuclear Fuels," TMS2011, Feb. 27, 2011, pp. 1-18.
Savchenko et al., "Main results of the development of dispersion type IMF at A.A. Bochvar Institute," Journal of Nuclear Material, vol. 396, 2010, pp. 26-31.

\* cited by examiner

ALLOYS FOR INERT MATRIX FUEL COMPOSITIONS, AND METHODS OF MAKING THE SAME

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The presently disclosed inventive concepts relate to inert matrix nuclear fuels (IMF), and more particularly to alloy compositions and techniques for forming an IMF product effective for use in ultra-high burn up applications.

BACKGROUND

Inert matrix fuels (IMFs) are formulations of a nuclear fuel dispersed in a metallic matrix, and present a promising opportunity to improve the efficiency and utilization of fuel in nuclear energy applications, e.g. by enabling ultra-high burn up to minimize the amount of residual radioactive/radiotoxic material present in spent fuel material. IMFs are particularly promising because the formulations may exhibit high tolerance for fission gas products and large doses of irradiation, when appropriate alloy compositions are achieved.

Among the great challenges of materials science is discovering or developing a material satisfying "conflicting" requirements, so that it possesses specific properties for a particular application. Such is the case for metals used in various components of nuclear fuels, especially those fuels intended to be used for high or ultrahigh burn-up. In particular, for a specific ultrahigh burn-up nuclear fuel form, a metal alloy that has both very high thermal conductivity but also relatively low melting temperature is required. In addition, to withstand conditions of ultrahigh burn-up, it is desirable to have a ductile, high-strength material that also exhibits chemical inertness to prevent reactivity between the fuel cladding and the fuel kernel. Finally, fission gases produced during fuel burn-up must be accommodated, so gas getting ability is desirable.

However, existing IMFs produced to-date have not been demonstrated to exhibit the foregoing desirable characteristics, and accordingly, it would be highly beneficial to provide novel formulations of materials suitable for use as IMFs and which exhibit the foregoing characteristics, as well as methods of making the same.

SUMMARY

In one embodiment, an alloy includes: Zr; Fe; Cu; Ta in an amount from about 1 wt % to about 3 wt %; and one or more optional constituents selected from: Ti, Be, and Nb; and wherein the alloy comprises a ductile phase and a nanoprecipitate hard phase.

According to another embodiment, a method of forming an inert matrix nuclear fuel includes: packing a hollow structure with fuel pellets and alloy precursor pellets; heating the fuel pellets and the alloy precursor pellets to at least a melting temperature of an alloy to be formed by melting the alloy precursor pellets; and solidifying the alloy into a matrix surrounding the fuel pellets. The alloy precursor pellets independently comprise: Zr; Fe; Cu; Ta present in an amount from about 1 to about 3 wt %; and one or more optional alloy constituents selected from: Ti, Be, and Nb.

Other aspects and embodiments of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, reference should be made to the following detailed description read in conjunction with the accompanying drawings.

DETAILED DESCRIPTION

Figure 1:
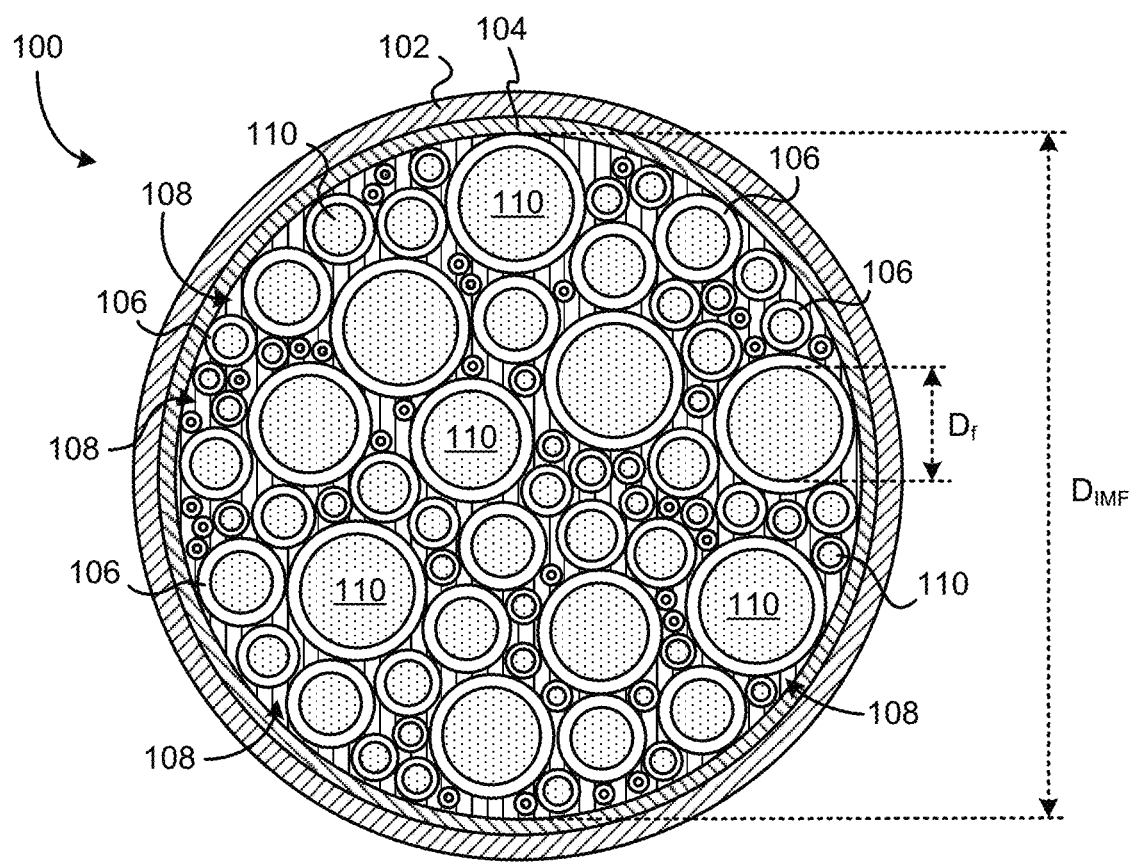
FIG. 1 is a simplified, cross-sectional schematic of an IMF structure comprising a continuous matrix of an alloy disposed in a tube, the continuous matrix of the alloy encapsulating fuel particles disposed in the tube, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

As also used herein, the term "about" when combined with a value refers to plus and minus 10% of the reference value. For example, a length of about 1 µm refers to a length of 1 µm±0.1 µm.

It must also be noted that, as used in the specification and the appended claims, the singular forms "a," "an" and "the" include plural referents unless otherwise specified.

As employed herein, the term "independently" when modifying members of a group will be understood to mean that each member of the group individually satisfies the stated condition independent of other members. For example, "alloy precursor pellets independently comprising one or more alloy constituents selected from: Zr, Fe, Cu, Ta, Ti, Be, and Nb" encompasses embodiments in which all pellets comprise a single constituent selected from: Zr, Fe, Cu, Ta, Ti, Be, and Nb; embodiments in which the pellets all individually comprise each of the constituents; and all possible combinations or permutations between these two extremes (e.g. pellets individually comprising different combinations/permutations of 2, 3, 4, 5, or 6 of the constituents, as well as pellets individually comprising different combinations/permutations of different numbers of the constituents).

The presently disclosed inventive concepts relate to formation of alloys suitable for use in a variety of applications such as brazing, soldering, light alloy synthesis, and ultra-high burn up nuclear fuel. More particularly, in the context of ultra-high burn up nuclear fuel, the alloys described herein are suitable for use in the form of an inert matrix nuclear fuel (IMF) when combined with appropriate nuclear fuel and formed as described herein.

In one general embodiment, an alloy includes: Zr; Fe; Cu; Ta in an amount from about 1 wt % to about 3 wt %; and one or more optional constituents selected from: Ti, Be, and Nb; and wherein the alloy comprises a ductile phase and a nanoprecipitate hard phase.

According to another general embodiment, a method of forming an inert matrix nuclear fuel includes: packing a hollow structure with fuel pellets and alloy precursor pellets; heating the fuel pellets and the alloy precursor pellets to at least a melting temperature of an alloy to be formed by melting the alloy precursor pellets; and solidifying the alloy into a matrix surrounding the fuel pellets. The alloy precursor pellets independently comprise: Zr; Fe; Cu; Ta present in an amount from about 1 to about 3 wt %; and one or more optional alloy constituents selected from: Ti, Be, and Nb.

A promising form of nuclear fuel, especially for high burn-up applications, is the inert matrix nuclear fuel in a dispersed metallic matrix form, due to the high tolerance for fission gas products and large irradiation doses. Without wishing to be bound to any particular theory, the inventors propose the high performance of alloys as described herein stems from (i) the incorporation of void space to accommodate fission gas products to prevent swelling/cracking, (ii) the direct metallurgical bond between fuel meat and alloy to maintain high thermal conductivity away from the active fuel, and (iii) the natural passivation of the alloy to protect against fuel-alloy chemical interactions.

Such a fuel form can advantageously maintain high fuel density. To enable such a formulation, the matrix metal preferably melts at a temperature low enough to maintain the integrity of the fuel, but high enough to ensure stable reactor operation (e.g. approximately 800 to 950° C. for typical reactors). However, finding a metal alloy meeting these requirements while also maintaining mechanical strength and the other desirable properties noted above is a significant challenge.

Computational thermodynamics and kinetics tools may be utilized to explore a set of materials, in the context of the present disclosure Zr-based metal matrix alloys that achieve sufficiently low melting temperatures, while incorporating small fractions of one or more specific secondary phases during solidification. The combination of a Zr-based metal matrix with nanoprecipitates facilitates strength and reliability as well as high thermal conductivity. The preferred base alloy is body-centered-cubic (BCC) Zr, which is ductile and highly thermally conductive. The secondary phases preferably getter fission gases in addition to providing mechanical strength, further improving the performance of ultra-high burn-up fuel.

More generally, the presently disclosed inventive concepts encompass various embodiments of specific metal alloy compositions with high thermal conductivity and low melting temperature, although the full suite of materials properties are specifically suited as the inert matrix metal for dispersion-type ultra-high burn up nuclear fuels. Accordingly, the following descriptions are provided with reference to several exemplary classes of alloys (separated according to composition) and illustrative embodiments of each class. It should be understood that the presently disclosed inventive concepts therefore extend across the full range of compositions stated, in any combination or permutation falling within the stated boundaries, as well as equivalents thereof that would be appreciated by a person having ordinary skill in the art upon reading the present disclosure.

Preferred embodiments of the presently disclosed alloys based on zirconium meet all of the above requirements. The alloys preferably melt at temperatures considerably lower than bulk zirconium, but still high enough to enable safe operation in a nuclear reactor, and also maintain high thermal conductivity from the high fraction of zirconium. The preferred alloys solidify into a ductile phase, with a small volume fraction of strengthening secondary phase particles dispersed in the matrix which also preferably convey fission gas-gettering properties.

Such fuels can be efficiently manufactured by packing a cladding tube or other suitable structure with fuel powder and impregnating with a molten matrix metal that solidifies to coat the particles. Using this general approach, a structure 100 such as shown in FIG. 1 may be achieved. The structure 100 includes an exterior wall 102 such as a Zr cladding optionally having interior surface(s) thereof coated with a metal coating layer 104. The exterior wall 102 and optional metal coating layer 104 may be characterized by an inner diameter $D_{IMF}$ in a range from approximately 5 mm to approximately 10 mm, in various embodiments and particularly where the exterior wall is provided in the form of a tube and is intended for use as an IMF for ultra-high burn up applications. In preferred embodiments, the metal coating layer 104 has a composition substantially identical to an alloy used to form a metal matrix 106 surrounding fuel particles 110 disposed within the interior of the structure 100.

The metal matrix 106 is preferably in the form of a continuous matrix and substantially encapsulates the fuel particles 110 disposed in the structure 100. The metal matrix 106 also preferably defines a plurality of pores 108 distributed throughout the interior volume of the structure 100, more preferably in a manner that defines a continuous network of pores 108 throughout some or all of the interior volume of the structure 100. The pores 108 may ideally occupy approximately 30-40 vol % of the interior volume of the structure 100 to accommodate fission gasses produced during the burn up, in various embodiments, while the encapsulated fuel particles 110 preferably occupy approximately 50-60 vol % of the interior volume of the structure 100, and the remainder of the volume is occupied by the metal matrix 106.

With continuing reference to the metal matrix 106, in some approaches at least 95 vol % of the alloy is characterized by a body-centered-cubic (BCC) crystalline phase, and preferably comprises BCC zirconium. The volume fraction of the metal matrix which is BCC may be as low as 50 vol % without departing from the scope of the presently disclosed inventive concepts, but is preferably 90 vol % or more, more preferably 95% vol % or more, and most preferably 98 vol % or more. Several exemplary embodiments described herein have been calculated to exhibit a solidifying phase characterized by 61 vol % BCC phase, 97 vol % BCC phase, and 98 vol % BCC phase, respectively.

Furthermore, the metal matrix 106 preferably comprises an alloy composition as described herein, including three or more constituents selected from: Zr, Fe, Cu, Ta, Ti, Be, and Nb, and exhibits a ductile phase and a nanoprecipitate hard phase. Most preferably the ductile phase comprises BCC zirconium, and the nanoprecipitate hard phase comprises FeTi present in a nonzero amount of approximately 0.1 vol % or less of the alloy.

According to several general embodiments, specific examples of which will be described further below and shown in the Tables, the alloy may be characterized by a formula $Zr_xFe_yCu_zM^1_a$, where: x is a value in a range from about 55 to about 95 wt %; y is a value in a range from about 2.5 to about 15 wt %; z is a value in a range from about 0.5 to about 5 wt %; $M^1$ is selected from Ta, Ti, Nb and Be; and a is a value in a range from about 1 to about 20 wt %. In more preferred embodiments of the foregoing general composition, x is a value in a range from 58.5 to 73 wt %; y is a value in a range from 10 to 20 wt %; z is a value in a range from 1.5 to 5 wt %; $M^1$ is Ti; and a is a value in a range from 12 to 20 wt %. The foregoing embodiments fall within group (III) described below, and exhibit particularly advantageous characteristics for IMF applications, especially a high volume fraction of alloy being BCC zirconium and appropriate melting temperature.

In more approaches, the alloy of metal matrix 106 may be generally characterized by a formula $Zr_xFe_yCu_zM^1_aM^2_b$, where: x is a value in a range from about 55 to about 90 wt %; y is a value in a range from about 5 to about 15 wt %; z is a value in a range from about 0.5 to about 5 wt %; $M^1$ is selected from Ta, Ti and Be; $M^2$ is selected from Ta, Nb and Be; $M^1 \neq M^2$; a is a value in a range from about 1 to about 20 wt %; and b is a value in a range from about 1 to about 3 wt %. More specifically, in some embodiments the alloy composition may satisfy provisos including: x being a value in a range from 66 to 85 wt %; y being a value in a range from 4 to 7 wt %; z being a value in a range from 1 to 3 wt %; $M^1$ being Ti or Nb; $M^2$ being Be or Nb; a being a value in a range from 5 to 20 wt %; and b being a value in a range from about 1 to about 3 wt %. The foregoing compositions generally fall within groups (I) and (II) described herein.

With continuing reference to FIG. 1, in various embodiments fuel particles 110 may be characterized by an outer diameter $D_f$ in a range from approximately 0.5 to approximately 1.0 mm in diameter, and may be provided in the form of powder or pellets which may be combined with alloy precursor pellets, packed into an appropriate container, heated and solidified to form an IMF structure such as shown in FIG. 1, e.g. according to a method 800 as shown in FIG. 8 and described further below.

In some embodiments, the fuel may be or include one or more nuclear fuel components, e.g. $PuO_2$, $UO_2$, rock-like oxide (ROX) fuel such as yttria-stabilized zirconia (YSZ), spinel ($MgAl_2O_4$), minor actinides (MA), magnesium oxide ($Mg_2O$) and/or any other suitable nuclear fuel component utilized in nuclear fuel applications, as would be understood by a person having ordinary skill in the art upon reading the present descriptions. In more embodiments, the fuel may be or include a braze composition or mixture as would be appreciated by a skilled artisan upon reading the present disclosures. In still more embodiments, the fuel may be or include a solder composition or mixture that a person having ordinary skill in the art would comprehend as suitable based on reviewing these descriptions.

Figure 2A:
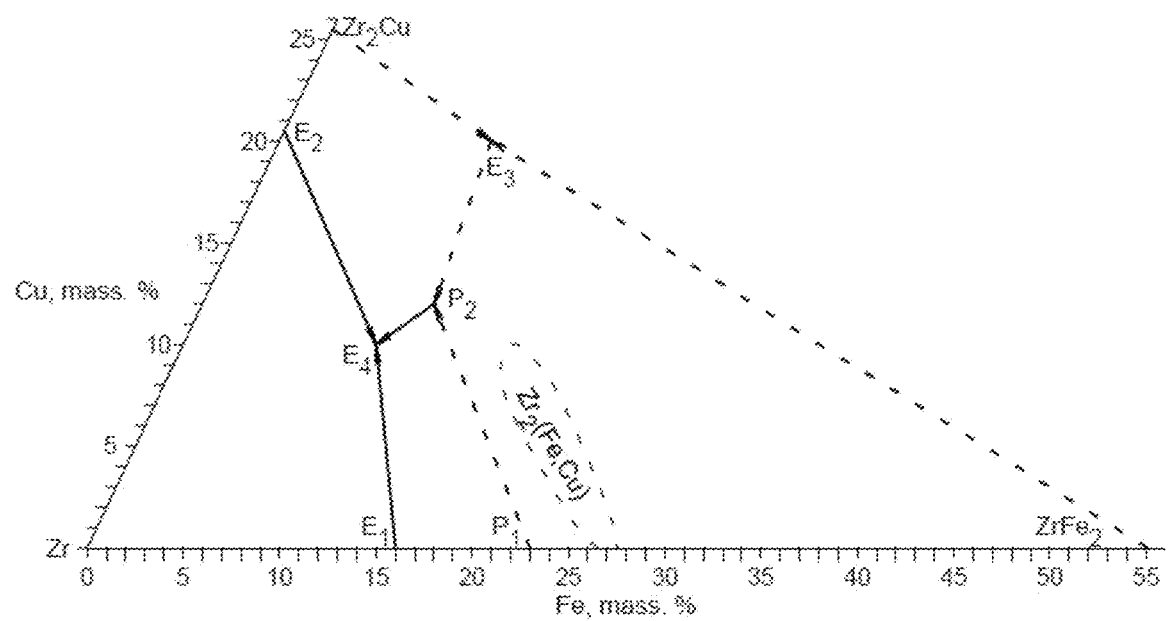
FIG. 2A is an experimental estimate of a liquidus surface for an alloy comprising ZrFeCu, according to one embodiment.
Figure 2B:
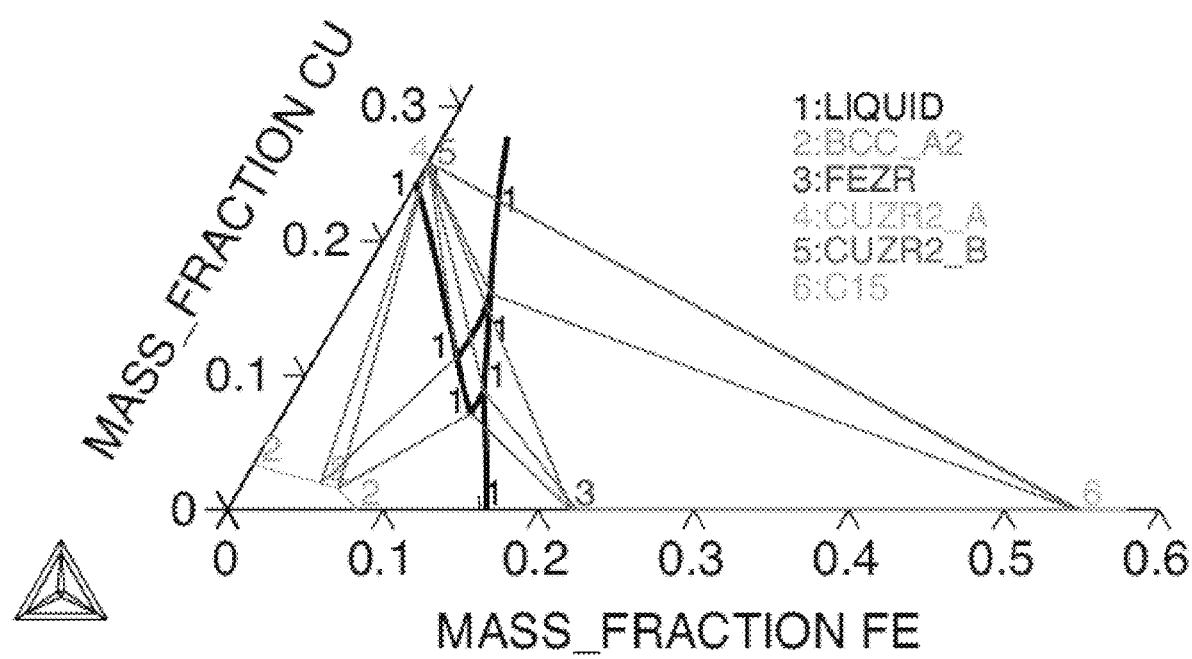
FIG. 2B is a calculated estimate of a liquidus surface for an alloy comprising ZrFeCu, according to one embodiment.

Turning now to FIGS. 2A-2B respectively, experimental and theoretical estimates of a liquidus surface for an alloy comprising ZrFeCu are shown, according to one embodiment. The invariant points and phase boundaries for the ZrFeCu systems are in fair agreement between the experiments (FIG. 2A) and the thermodynamic database predictions (FIG. 2B), however, the database includes a more complete set of phases and shows more complex features, including a solid phase boundary near pure Zr. The E2 eutectic point also occurs at slightly higher wt %-Cu in the calculated property diagram of FIG. 2B, while E3 is at a slightly lower wt %-Fe.

Figure 2C:
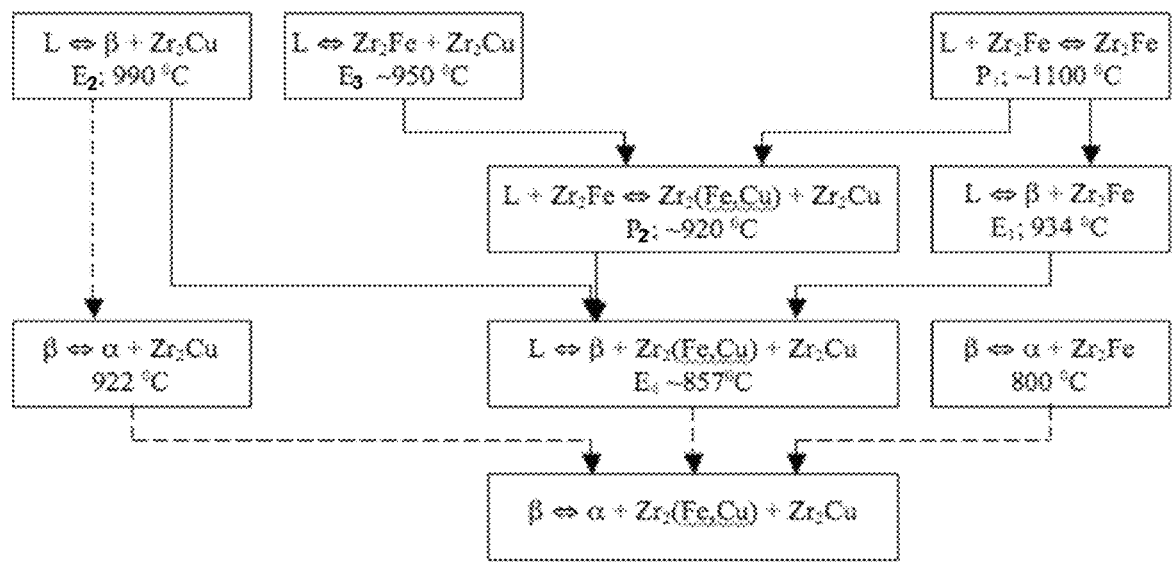
FIG. 2C is a theoretical schema for monovariant and nonvariant transformations in a ZrFeCu system, according to one embodiment.

FIG. 2C represents a proposed schema of monovariant and nonvariant transformations for a ZrFeCu system exhibiting a liquidus surface with characteristics as shown in FIG. 2A.

Figure 3A:
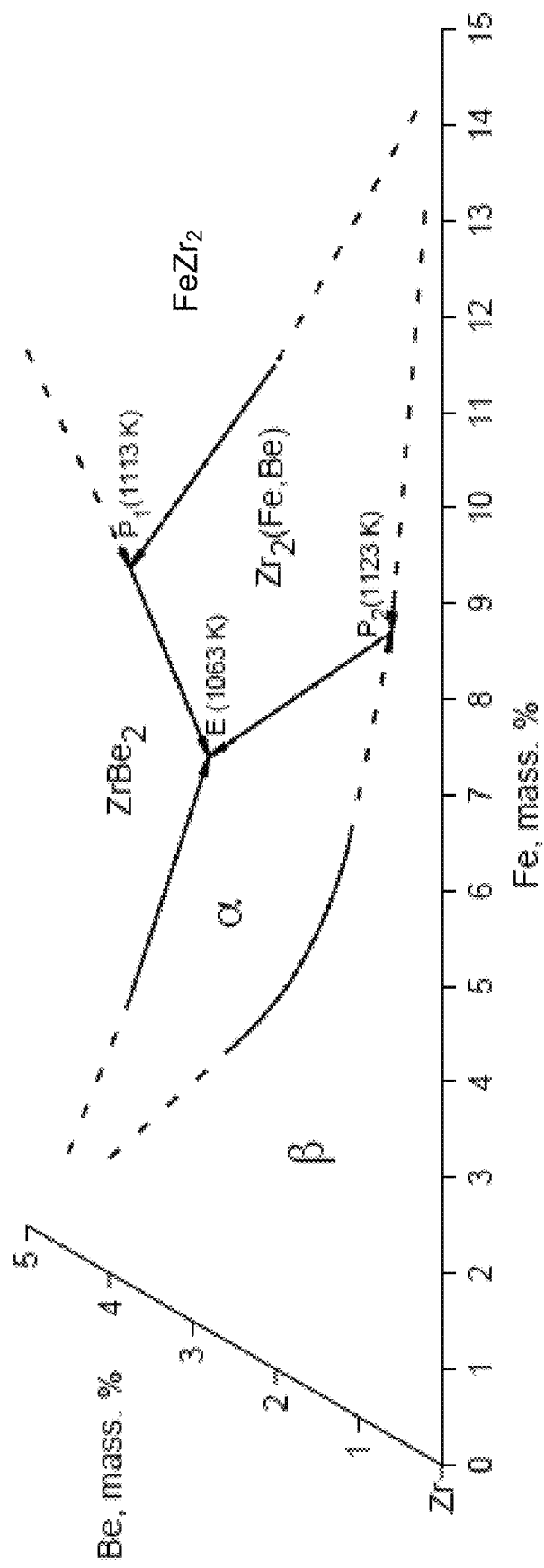
FIG. 3A is an experimental estimate of a liquidus surface for an alloy comprising ZrFeBe, according to one embodiment.
Figure 3B:
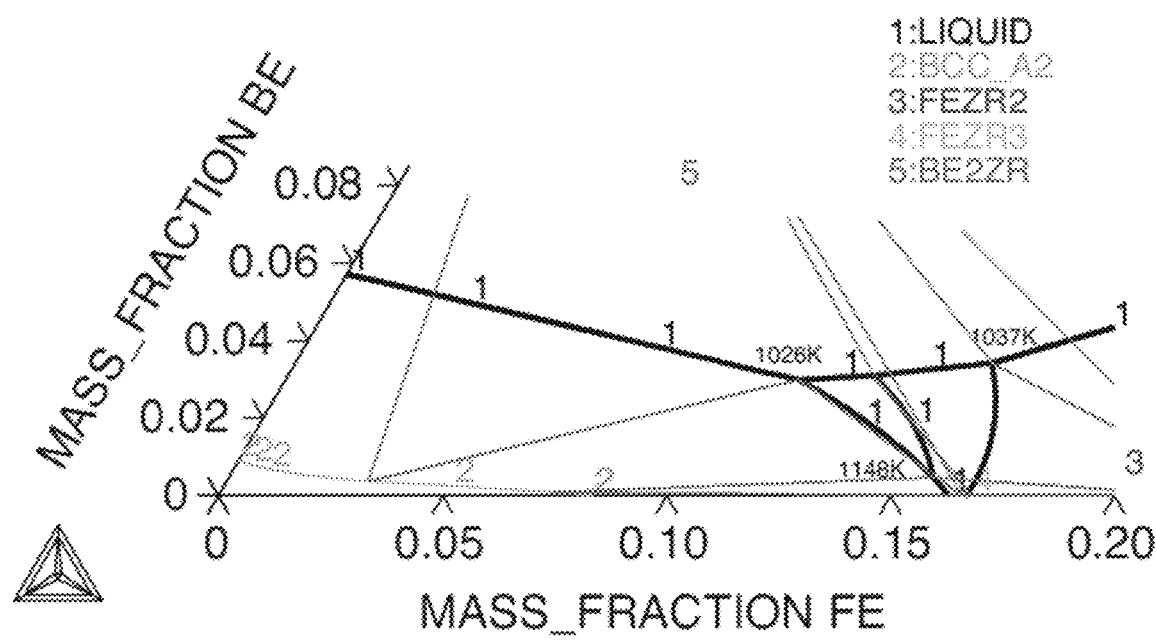
FIG. 3B is a calculated estimate of a liquidus surface for an alloy comprising ZrFeBe, according to one embodiment.

Similarly, in FIGS. 3A-3B, experimental and theoretical estimates are shown, respectively, a liquidus surface for an alloy comprising ZrFeBe. The comparison for the Fe—Be—Zr system is less quantitatively accurate, although qualitatively there is very good agreement. Again, there is additional complexity in the calculated property diagram, which includes more phases (most notably, the FeZr3 phase) than considered in the experimental data shown in FIG. 3A. Quantitatively, quite significant differences are notable in the position of the α/β phase boundary and the three labeled invariant points (E, P1, P2).

Figure 3C:
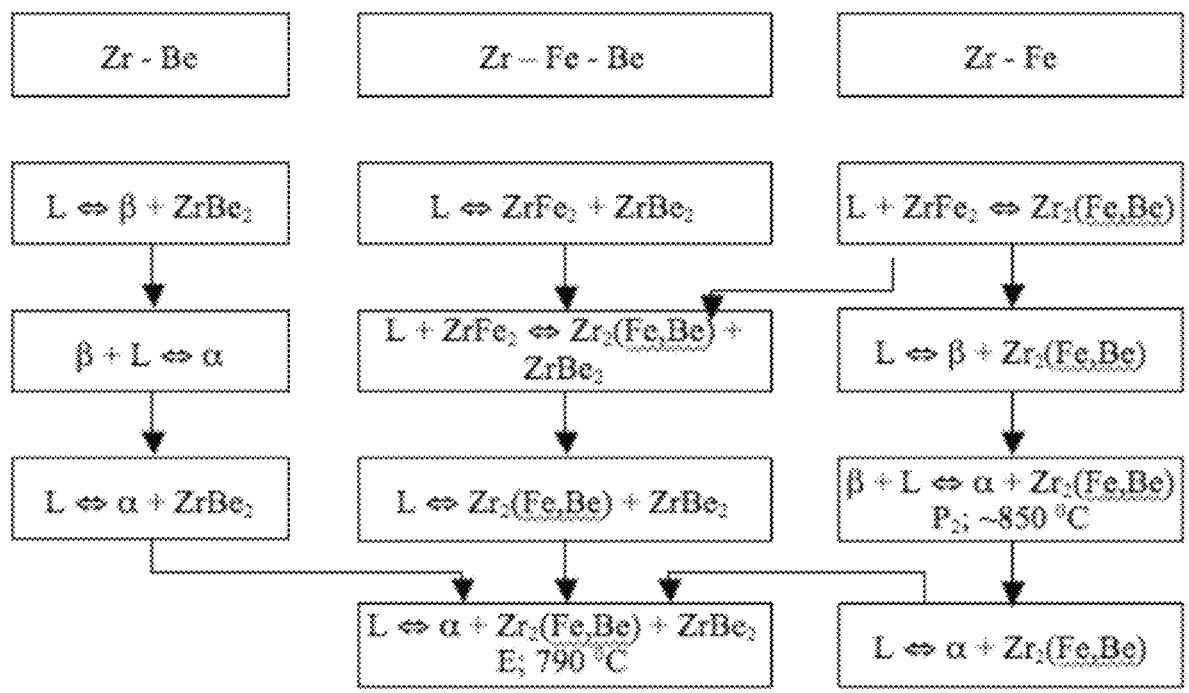
FIG. 3C is a theoretical schema for monovariant and nonvariant transformations in a ZrFeBe system, according to one embodiment.

FIG. 3C represents a proposed schema of monovariant and nonvariant transformations for a ZrFeBe system exhibiting a liquidus surface with characteristics as shown in FIG. 3A.

In various embodiments, multi-component alloys containing up to 7 elements meeting the above criteria were developed. Initial studies were based on a novel computational material science approach using global constrained optimization coupled to a thermodynamic database.

Zirconium (Zr) exhibits the highest thermal conductivity of all metals in elemental form, and therefore serves as a suitable candidate for use as the primary component of the alloys described herein. However, as a refractory metal, Zr also has a very high melting point of 1860° C., far above the desired range for different applications referenced herein, especially the desired range of approximately 800-950° C. for ultra-high burn up nuclear fuel applications. Accordingly, it was necessary to identify compositions of alloys that convey the advantageous ductility and thermal conductivity of Zr, while exhibiting a melting temperature in the desired range.

Compositions including up to 7 elements selected from Zr, Fe, Cu, Ta, Ti, Nb, and/or Be were therefore investigated, with various constraints imposed to accomplish the desired properties and characteristics for use in IMF matrix metal applications. Namely, and according to one embodiment, the constraints for such properties and characteristics include one or more of the following: a melting temperature (solidus) between 800-950° C.; a major solidifying phase being BCC to promote ductility which prevents cracking at high stress in ultra-high burn-up conditions; inclusion of secondary phase precipitates (preferably in small amounts such as from about 0.001 to about 0.1 vol %) to promote precipitation hardening, which increase strengths and toughness of the alloy; minimized amounts (e.g. 0-5 wt %) of high thermal neutron cross-section elements (e.g., Cu) to prevent shadowing the fuel dispersed in the matrix; avoidance or exclusion of "difficult" elements (e.g., content of Be should be minimized to avoid safety issues in fabrication, which can significantly impact usability, cost, and regulatory compliance); a near-congruently solidifying major phase (or narrow solidification window) to better control final alloy composition; and finally, compositions preferably exhibits the foregoing properties in a manner robust to slight variations in fabrication (i.e., properties change only slightly with small variations or errors in composition).

Several of the foregoing exemplary constraints are soft constraints (e.g. avoidance of difficult elements) and are used to rank possible alloys (or classes of alloys) in order of preference rather than exclude unsuitable compositions. Several alloys described herein meet many, if not all, of the requirements and constraints.

Figure 4A:
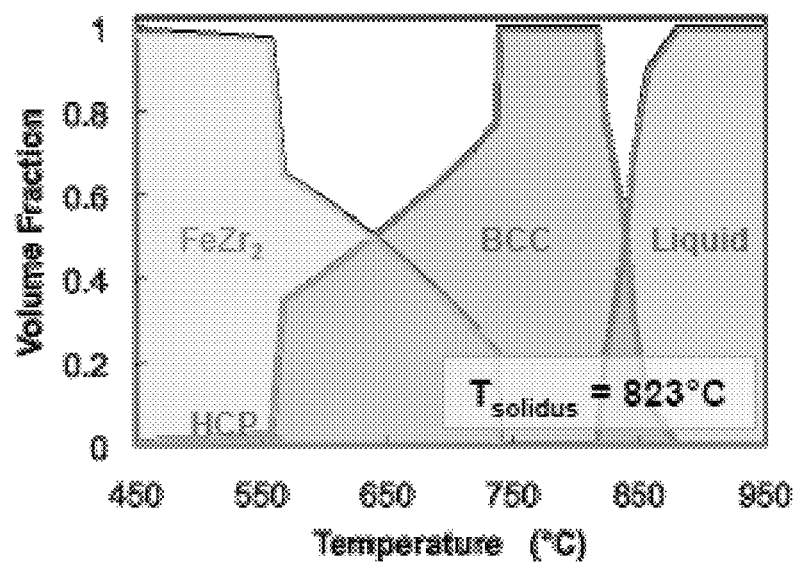
FIG. 4A is a property diagram showing various crystalline phases of an alloy by volume fraction and temperature, according to one embodiment.

In particular, a range of ZrFeCuTi alloys meets essentially all of the criteria above, melting around 820-840° C. According to several preferred embodiments, a composition may include 58.5 wt % Zr, 20 wt % Fe, 20 wt % Ti, and 1.5 wt % Cu. This particular alloy is additionally favorable in that the solidification thereof precipitates a small volume fraction (~0.001 to ~0.1 vol %) of FeTi secondary phase, which promotes hardening and also conveys a fission gas gettering functionality to the alloy. A second particularly preferred alloy composition is: 73 wt % Zr, 12 wt % Ti, 10 wt % Fe, 5 wt % Cu; and a third particularly preferred alloy composition is 63.4 wt % Zr, 15 wt % Fe, 12 wt % Cu, 9.6 wt % Ti. Property diagram data for these three particularly preferred exemplary embodiments are shown in FIGS. 4A-4C, respectively.

Notably, the first particularly preferred embodiment including 58.5 wt % zirconium is characterized by an abrupt liquidus/solidus transition barrier, resulting in desirably abrupt solidification of the alloy composition and concomitant formation of BCC zirconium as the major solid phase. Indeed, the first particularly preferred embodiment is characterized by approximately 97 vol % of the major solidifying phase being BCC zirconium. Further still, the alloy includes nonzero, but small, amounts of FeTi precipitates to facilitate fission gas gettering.

Figure 4B:
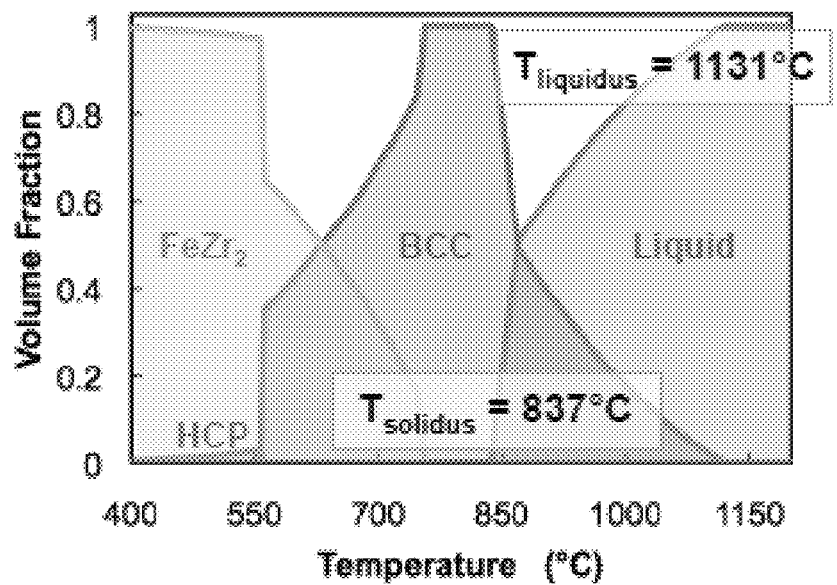
FIG. 4B is a property diagram showing various crystalline phases of an alloy by volume fraction and temperature, according to one embodiment.
Figure 4C:
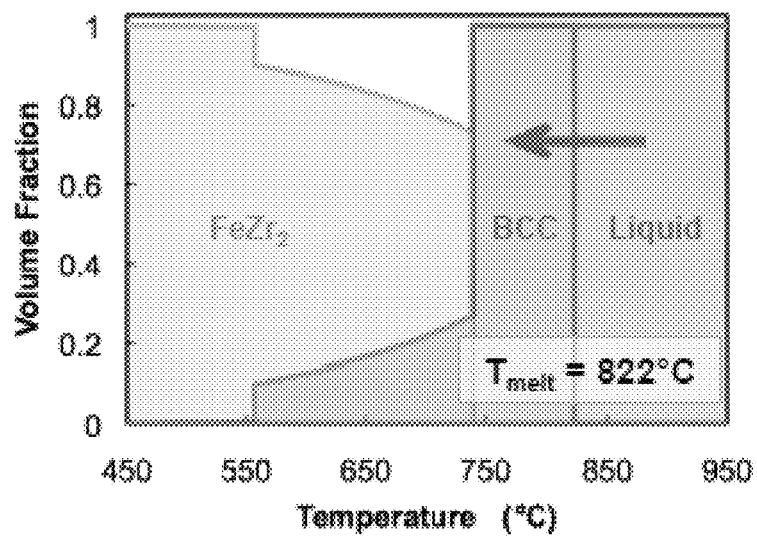
FIG. 4C is a property diagram showing various crystalline phases of an alloy by volume fraction and temperature, according to one embodiment.

The second particularly preferred embodiment, comprising 73 wt % zirconium, also exhibits desirable formation of BCC zirconium as the major solidifying phase, and FeTi nanoprecipitate presence, but as can be seen from the property diagram of FIG. 4B undesirably exhibits a gradual liquidus/solidus transition, resulting in gradual solidification of the alloy.

The third particularly preferred embodiment, comprising approximately 63.4 wt % zirconium, is characterized by the most abrupt liquidus/solidus transition and associated solidification of all three particularly preferred embodiments. However, at temperatures up to 750° C. the alloy may form significant amounts of $FeZr_2$ as the solidifying phase, to the expense of the preferred BCC Zr.

As noted above, optimizations were conducted for various embodiments of four exemplary classes of alloys with constrained compositions as follows.

Be—Cu—Fe—Ti—Zr (<5 wt %-Be, <5 wt %-Cu, <10 wt %-Fe, 5-20 wt % Ti) (I)

Be—Cu—Fe—Nb—Zr (<5 wt %-Be, <5 wt %-Cu, <10 wt %-Fe, <5 wt % Nb) (II)

Fe—Cu—Ti—Zr (<20 wt %-Fe, <20 wt %-Cu, <20 wt %-Ti) (III)

Fe—Cu—Zr (<15 wt %-Fe, <15 wt %-Cu) (IV)

Within these compositional constraints, the composition of each system that yields the minimum liquidus temperature was determined. [Note that the liquidus temperature was later determined to be a relatively poor measure of "melting temperature," as opposed to the solidus. A comparison of the results using the solidus temperature is described below.] The lowest liquidus temperature shown for each system is the minimum liquidus temperature within the stated composition range for the respective class of alloy. The remainder of each composition is zirconium.

For group (I), ZrFeCuTiBe, an alloy having a composition of approximately 3 wt % Be, 3 wt % Cu, 10 wt % Fe, 20 wt % Ti, and the remainder Zr yielded a $T_{liq}$ of approximately 599° C. and exhibited $FeZr_2$ or $FeZr_3$ as the major solid phase.

For group (II), ZrFeCuNbBe, an alloy having a composition of approximately 3 wt % Be, 5 wt % Cu, 8 wt % Fe, 0.17 wt % Nb, and the remainder Zr yielded a $T_{liq}$ of approximately 724° C. and exhibited $FeZr_3$ as the major solid phase. In another embodiment of group (II), an alloy having a composition of approximately 3 wt % Be, 3 wt % Cu, 10 wt % Fe, 0.25 wt % Nb, and the remainder Zr yielded a $T_{liq}$ of approximately 732° C.

For group (III), ZrFeCuTi, according to one embodiment an alloy having a composition of approximately 4.8 wt % Cu, 17 wt % Fe, 16 wt % Ti, and the remainder Zr yielded a $T_{liq}$ of approximately 823° C. and exhibited BCC zirconium as the major solid phase. According to another embodiment of group (III), an alloy having a composition of approximately 14 wt % Cu, 10 wt % Fe, 19 wt % Ti, and the remainder Zr yielded a $T_{liq}$ of approximately 838° C.

For group (IV), ZrFeCu, an alloy having a composition of approximately 12 wt % Fe, 7.2 wt % Cu, yielded a $T_{liq}$ of approximately 895° C. and exhibited BCC zirconium as the major solid phase.

In another embodiment of group (IV), an alloy having a composition of approximately 1.2 wt % Fe, 45 wt % Cu, and the remainder Zr yielded a $T_{liq}$ of approximately 901° C. (Note this particular composition is outside the above-specified specified initial compositional range, indicating that alloys with suitable thermodynamic characteristics may be achieved using a broader range of compositions. Accordingly, the presently disclosed inventive alloys are not limited to those included in the initial compositional constraints set forth above, but may include any range of suitable compositions described herein, according to various embodiments.)

Sensitivity analysis was performed by mapping the liquidus or solidus temperatures around the minimum over a range of ±2 wt % for each element included in the respective alloy class. The ratio of the basin average temperature to the minimum temperature is then defined as one measure of the steepness of the minimum (a higher ratio indicates a steeper minimum). The results of this sensitivity analysis are presented in Table I below, along with a comparison between the liquidus minimizations and solidus minimizations. Sensitivity ratio values close to 1.0 are preferred, since that corresponds to minimum variation in the melting property with small composition variations or errors. In general, less variation and shallower minima are associated with the solidus surface.

TABLE I

Sensitivity Data for Minimum Liquidus and Solidus Temperatures Across Exemplary Alloy Systems

| Alloy Composition | Min Liquidus (° C.) | Sensitivity Ratio (liquidus) | Min Solidus (° C.) | Sensitivity Ratio (solidus) |
|---|---|---|---|---|
| (I) ZrFeCuTiBe | 599 | 1.315 | 591 | 1.006 |
| (II) ZrFeCuNbBe | 724 | 1.319 | 707 | 1.013 |
| (III) ZrFeCuTi | 823 | 1.068 | 691 | 1.028 |
| (IV) ZrFeCu | 895 | 1.079 | 894 | 1.002 |

As shown in Table I, the relative ordering of the minima generally does not change among the alloy systems (e.g. I<II<III<IV), although the absolute differences between temperatures can be significantly different. Additionally, the compositions of the minimum liquidus and solidus do not coincide (although in some cases are similar).

For an ideal IMF matrix metal, a BCC major phase is desired to promote ductility. Small precipitates may provide hardening. FeTi precipitates may be particularly favorable since they also provide fission gas gettering properties. In light of these considerations, the FeCuTiZr alloys described herein are preferred, especially where the major solid phase is BCC and small amounts of FeTi also solidify (<0.1 vol % FeTi). The melting (liquidus) temperature of such compositions is also in a good range (slightly above 800° C.). However, according to some embodiments there is a solid-phase transformation from the BCC phase to $FeZr_2$ at lower temperatures (~575° C.), which may or may not be kinetically limited, and may be undesirable for certain applications.

Turning now to group (I), ZrFeCuTiBe, the unconstrained result above exhibits a $T_{liq}$ of approximately 599° C. for the alloy having approximately 3 wt %-Be, 3 wt %-Cu, 10 wt %-Fe, 20 wt %-Ti, and the remainder Zr. If the liquidus temperature is further constrained to be ≥800° C. and an additional constraint requiring ≥50 vol % BCC phase solidifying, then the optimum composition is an alloy having approximately 5 wt-% Be, 5 wt %-Cu, 4 wt %-Fe, 16.2 wt %-Ti, and the remainder Zr. This composition exhibits a $T_{liq}$ of approximately 800° C.

Conversely, setting a constraint of a solidus temperature of 800° C., yields an optimal alloy having a composition of approximately 0.1 wt %-Be, 5 wt %-Cu, 10 wt %-Fe, 10.8 wt %-Ti, with the remainder being Zr, and exhibits a $T_{sol}$ of approximately 800° C.), which essentially removes the Be from the alloy.

Similar results are summarized in Tables II and III for other exemplary alloy compositions falling within the four groups generally set forth above.

TABLE II

Melting Temperature for Various Alloy Compositions

| Composition (wt %) | | | | | | | Melting Temperature | |
|---|---|---|---|---|---|---|---|---|
| Be | Cu | Fe | Nb | Ti | Zr | Liquidus | Equil. Solidus | Scheil Solidus |
| Group I: ZrFeCuTiBe | | | | | | | | |
| 2.0 | 2.0 | 5.5 | — | 12.5 | 78.0 | 1161.0 | 596[*1] | 591.0 |
| 2.0 | 2.0 | 4.0 | — | 5.0 | 87 | 1318.0 | 652.0 | 590.0 |
| 2.0 | 2.0 | 4.0 | — | 20.0 | 72 | 1169.0 | 600.0 | 591.0 |
| 1.5 | 1.0 | 4.0 | — | 5.0 | 88.5 | 1422.0 | 657[*2] | 590.0 |
| 2.5 | 3.0 | 7.0 | — | 10.0 | 77.5 | 967.0 | 593.0 | 591.0 |
| 2.5 | 3.0 | 7.0 | — | 20.0 | 67.5 | 893.0 | 591[*3] | 591.0 |
| 2.5 | 3.0 | 4.0 | — | 10.0 | 80.5 | 1143.0 | 609.0 | 591.0 |
| Group II: ZrFeCuNbBe | | | | | | | | |
| 2 | 0.5 | 4 | 1 | — | 92.5 | 1420 | 724 | 707 |
| 3 | 3 | 8 | 3 | — | 83 | 960 | 706 | 706 |
| 2.5 | 2 | 6 | 2 | — | 87.5 | 1161 | 706 | 706 |
| 2 | 3 | 4 | 3 | — | 88 | 1320 | 706 | 706 |
| 3 | 1 | 8 | 1 | — | 87 | 977 | 707 | 707 |
| 2 | 0.5 | 8 | 3 | — | 86.5 | 1167 | 706 | 706 |
| 3 | 3 | 4 | 1 | — | 89 | 1172 | 707 | 707 |
| Group III: ZrFeCuTi | | | | | | | | |
| — | 8 | 8 | — | 5 | 79 | 1136 | 851 | 828 |
| — | 8 | 8 | — | 7.5 | 76.5 | 1122 | 841 | 822 |
| — | 8 | 8 | — | 10 | 74 | 1110 | 847 | 822 |
| — | 14 | 14 | — | 5 | 67 | 1064 | 824 | 822 |
| — | 14 | 14 | — | 10 | 62 | 974 | 822 | 822 |
| — | 8 | 14 | — | 5 | 73 | 922 | 846 | 827 |
| — | 14 | 8 | — | 5 | 73 | 912 | 838 | 823 |
| — | 8 | 14 | — | 10 | 68 | 861 | 826 | 822 |
| — | 11 | 11 | — | 7.5 | 70.5 | 886 | 831 | 822 |
| Group IV: ZrFeCu | | | | | | | | |
| — | 6 | 6 | — | — | 88 | 1388 | 894 | 894 |
| — | 6 | 12 | — | — | 82 | 959 | 894 | 894 |
| — | 12 | 6 | — | — | 82 | 1148 | 894 | 894 |
| — | 9 | 9 | — | — | 82 | 1049 | 894 | 894 |
| — | 12 | 12 | — | — | 76 | 996 | 900 | 894 |

TABLE III

Melting Temperature Mean (Range) for Various Alloy Compositions

| Group | Liquidus (° C.) | Solidus Equil. (° C.) | Solidus Scheil (° C.) |
|---|---|---|---|
| I | 1150(350) | 635(35) | 591(1) |
| II | 1140(360) | 706(18) | 706(1) |
| III | 998(275) | 836(30) | 823(6) |
| IV | 1170(430) | 894(6) | 894(0) |

Figure 5A:
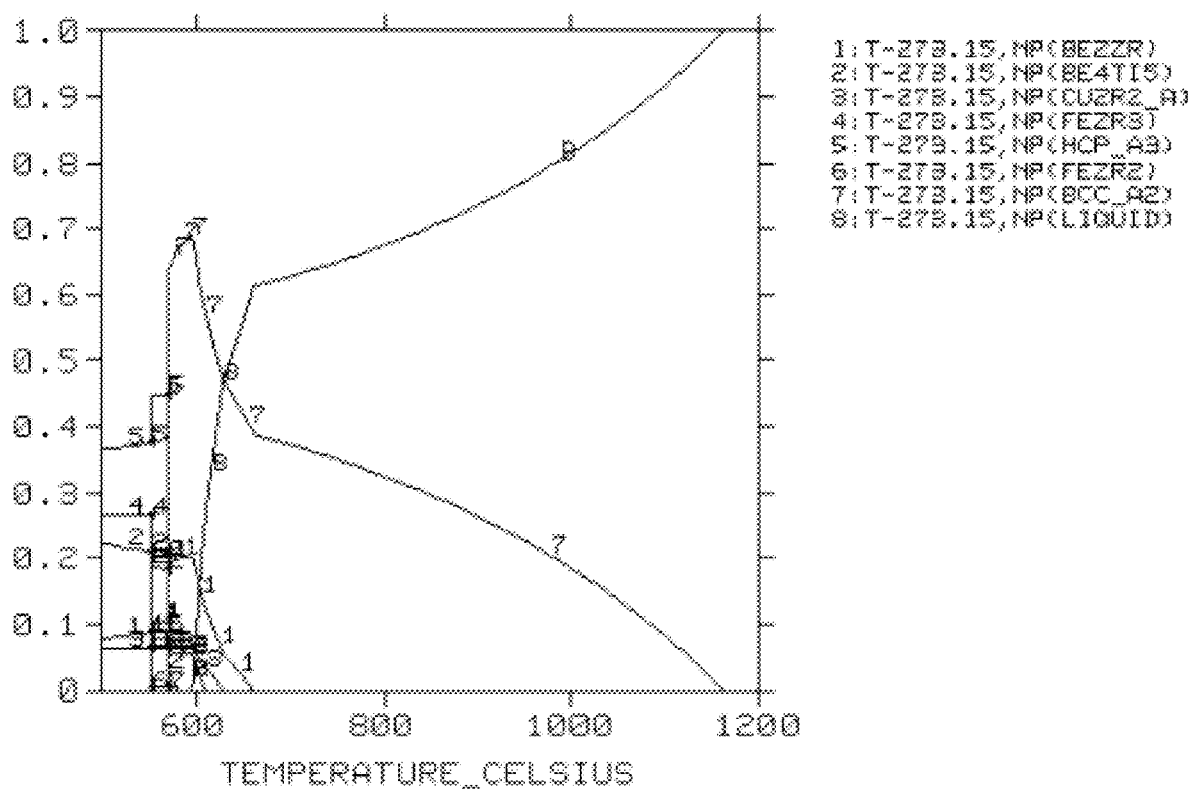
FIG. 5A is a property diagram showing various crystalline phases of an alloy by mole fraction and temperature, according to one embodiment.
Figure 5B:
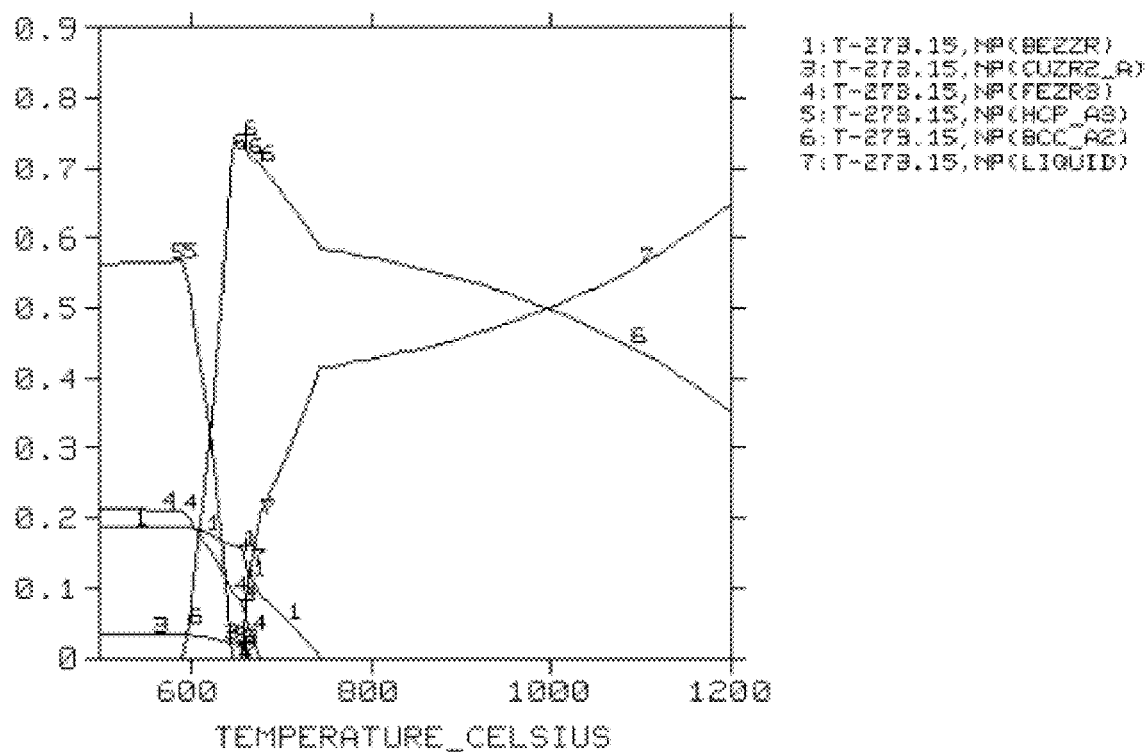
FIG. 5B is a property diagram showing various crystalline phases of an alloy by mole fraction and temperature, according to one embodiment.
Figure 5C:
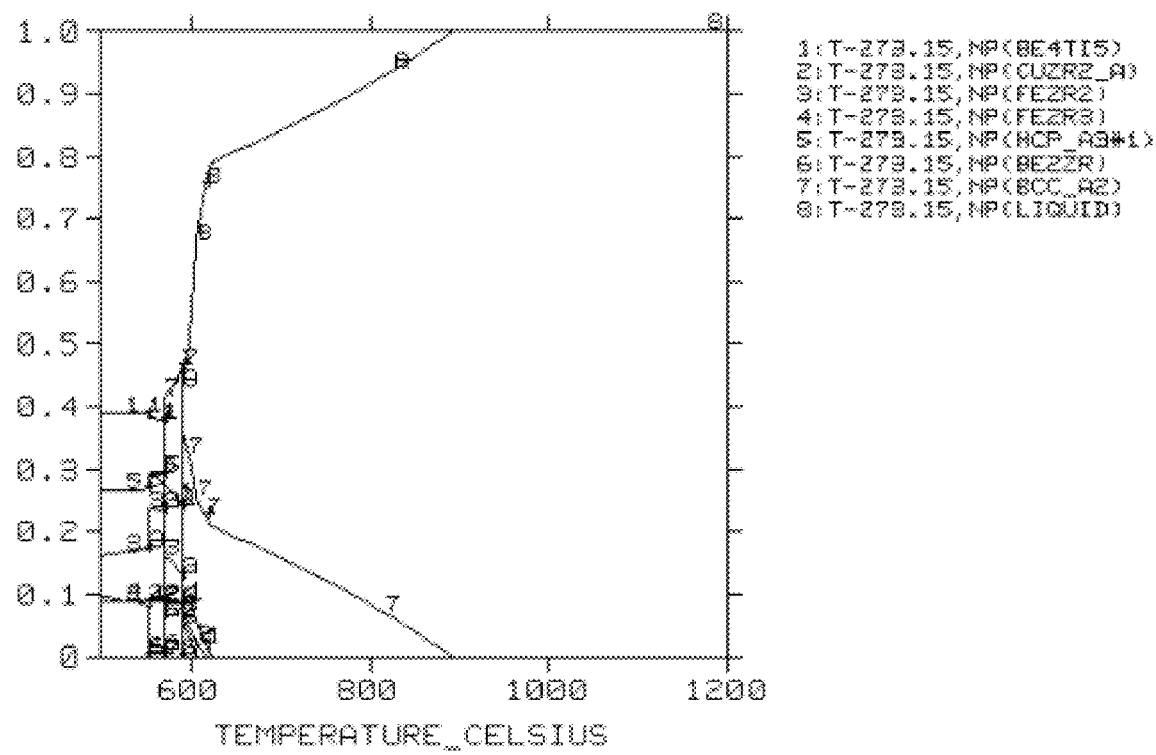
FIG. 5C is a property diagram showing various crystalline phases of an alloy by mole fraction and temperature, according to one embodiment.

FIGS. 5A, 5B and 5C respectively represent property diagrams for compositions [*1], [*2], and [*3] noted above in Table II, each corresponding to a different exemplary embodiment of a group (I) formulation. These illustrations show the wide difference in liquidus vs. solidus temperatures for different compositions within a relatively small range. The complexity of solidification is also illustrated with a large number of phases forming and disappearing near the solidus in some cases. More sophisticated solidification modeling, including kinetics, may be incorporated into the optimization model to best predict optimal alloys for the matrix metal.

Figure 6:
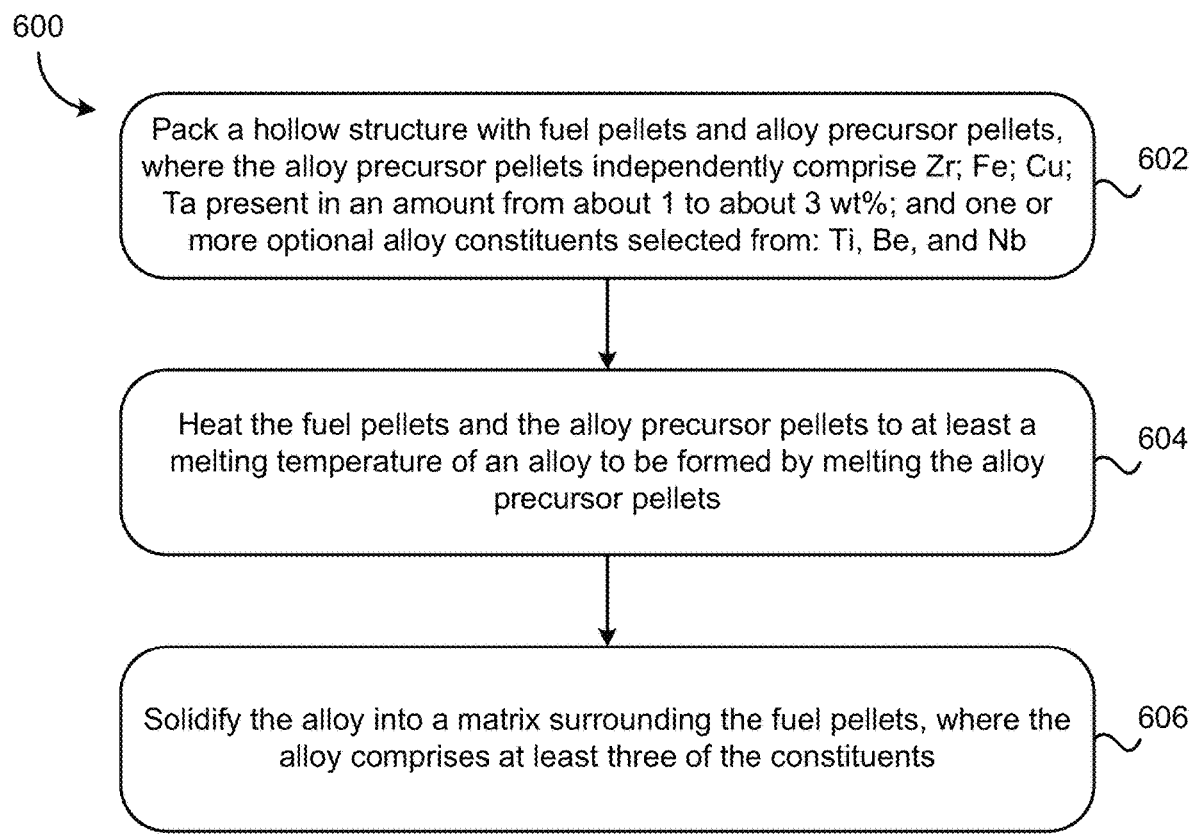
FIG. 6 is a flowchart of a method for forming an IMF structure, according to one embodiment.

Turning now to FIG. 6, a method 600 of forming an IMF structure is shown, according to one embodiment. The method 600 may be utilized to form IMF structures including alloys having any composition described herein, and may be performed in any suitable environment. The method 600 may include additional and/or alternative operations besides those shown in FIG. 6 in different embodiments, but generally and preferably follows the process prescribed in operations 602-606.

In operation 602, a hollow structure is packed with fuel pellets and alloy precursor pellets. The pellets may be obtained commercially, and comprise an appropriate fuel composition and alloy composition respectively as described herein. In various embodiments, the alloy precursor pellets may independently comprise one or more alloy constituents selected from Zr, Fe, Cu, Ta, Ti, Be and Nb. The pellets may be provided in the form of a powder, mixed, and packed into the hollow structure using any suitable technique that would be appreciated by a person having ordinary skill in the art, and may include pressing, vibration, etc.

In one approach, the fuel pellets are characterized by a diameter approximately 3-10 times larger than a diameter of the alloy precursor pellets. In preferred approaches, the fuel pellets are characterized by a diameter in a range from approximately 0.5 mm to approximately 1.0 mm. Accordingly, in various approaches the alloy precursor pellets may be characterized by a diameter in a range from approximately 50 microns to approximately 100 microns (10-fold difference), a diameter in a range from approximately 150 microns to approximately 300 microns (3-fold difference), or any range therebetween (e.g. 4- to 9-fold differences).

Preferably, the hollow structure comprises a cladding material such as zirconium formed into an appropriate configuration for subsequent use in the intended application. For instance, in preferred approaches the hollow structure comprises a tube of zirconium, optionally having formed on interior surfaces thereof a metal coating layer, e.g. an alloy having a same composition as used to form the metal matrix.

With continuing reference to FIG. 6, method 600 includes operation 604, in which the fuel pellets and the alloy precursor pellets are heated to at least a melting temperature of an alloy to be formed by melting the alloy precursor pellets. Notably, and as discussed above, the melting temperature of the alloy precursor pellets is preferably in a sufficiently low range (e.g. approximately 800-950° C. for IMF) to avoid compromising the fuel material.

The melting temperature, in various embodiments, may vary based on the application to which the fuel assembly is to be employed. For instance, in embodiments where the fuel assembly is to be utilized in nuclear reactions, the melting temperature is preferably in a range from approximately 800° C. to approximately 950° C., more preferably from approximately 820° C. to approximately 860° C., and most preferably from approximately 850° C. to approximately 860° C. In other embodiments, e.g. for producing brazing or soldering compositions, the melting temperature may preferably be lower, e.g. in a range from approximately 600° C. to approximately 700° C., or even lower, depending on the composition of the solder or braze material to be formed.

Those having ordinary skill in the art will appreciate the appropriate melting temperature range for a particular application of the presently disclosed inventive concepts upon reading the instant disclosure, and my select appropriate compositions as disclosed herein based on such understanding, as well as substitute equivalents thereof that would be intuitive based on reading these descriptions.

The heating may involve incubating the alloy precursor pellets and/or fuel pellets at or above the melting temperature of the alloy for a predetermined period to ensure complete melting of the alloy precursor pellets, in some approaches.

In operation 606, method 600 involves solidifying the alloy into a matrix surrounding the fuel pellets. The solidifying operation may be performed using any suitable conditions or techniques, but preferably is performed such that the alloy forms a continuous matrix encapsulating the fuel pellets via capillary action while also forming voids (pores) within the interior volume of the hollow structure. Furthermore, optionally but preferably, the solidification is performed so as to ensure approximately 95 vol % or more of the alloy is characterized by a BCC crystalline phase, most preferably BCC zirconium.

In addition, as noted above the alloy formed according to operations 604-606 of method 600 preferably comprises at least three of the constituents.

Optionally, the method 600 may include forming a metallic coating layer (e.g. 104) on interior surfaces of the hollow structure prior to packing the pellets into the hollow structure. The metallic coating layer preferably comprises a material having substantially the same composition as the alloy formed into the matrix.

As will be appreciated from a detailed review of the present descriptions, the alloy formed via method 600 may be an alloy having any suitable composition described herein. The illustrative examples referenced above and shown in the Figures and Tables should be understood as mere exemplars of the broader range of possible alloy compositions described herein. Accordingly, in various embodiments of method 600, the alloy may be characterized by a formula $Zr_xFe_yCu_zM^1_a$, where: x is a value in a range from about 55 to about 95 wt %; y is a value in a range from about 2.5 to about 15 wt %; z is a value in a range from about 0.5 to about 5 wt %; $M^1$ is selected from Ta, Ti, Nb and Be; and a is a value in a range from about 1 to about 20 wt %. In more preferred embodiments of the foregoing general composition, x is a value in a range from 58.5 to 73 wt %; y is a value in a range from 10 to 20 wt %; z is a value in a range from 1.5 to 5 wt %; $M^1$ is Ti; and a is a value in a range from 12 to 20 wt %. The foregoing embodiments fall within group (III) described below, and exhibit particularly advantageous characteristics for IMF applications, especially a high volume fraction of alloy being BCC zirconium and appropriate melting temperature.

In more approaches, the alloy of metal matrix may be generally characterized by a formula $Zr_xFe_yCu_zM^1_aM^2_b$, where: x is a value in a range from about 55 to about 90 wt %; y is a value in a range from about 5 to about 15 wt %; z is a value in a range from about 0.5 to about 5 wt %; $M^1$ is selected from Ta, Ti and Be; $M^2$ is selected from Ta, Nb and Be; $M^1 \neq M^2$; a is a value in a range from about 1 to about 20 wt %; and b is a value in a range from about 1 to about 3 wt %. More specifically, in some embodiments the alloy composition may satisfy provisos including: x being a value in a range from 66 to 85 wt %; y being a value in a range from 4 to 7 wt %; z being a value in a range from 1 to 3 wt %; $M^1$ being Ti or Nb; $M^2$ being Be or Nb; a being a value in a range from 5 to 20 wt %; and b being a value in a range from about 1 to about 3 wt %. The foregoing compositions generally fall within groups (I) and (II) described herein.

Of course, any formulation fitting the constraints set forth above with respect to group (IV), ZrFeCu, may also be formed according to method 600, in more approaches.

Uses and Applications

The presently disclosed inventive structures and techniques of forming the same have a wide variety of potential useful applications including nuclear fuels, brazing compounds, soldering compounds, etc. and may be implemented in such applications to great benefit.

In more embodiments, the presently disclosed inventive alloy compositions may be utilized in the synthesis of light alloys exhibiting low density and high strength-to-weight ratios.

The alloy formulations described in disclosure are particularly useful as inert metal matrix for nuclear fuels, particularly high-burn-up and ultra-high-burn-up fuels. Various embodiments may have broader uses in other applications that require low-melting, high-thermal conductivity metal alloys, such as brazing and soldering, as well as in pure alloy synthesis applications, particularly light alloy synthesis and low temperatures casting.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An alloy, comprising:
   Zr;
   Fe;
   Cu;
   Ta in an amount from about 1 wt % to about 3 wt %; and
   one or more optional constituents selected from: Ti, Be, and Nb; and
   wherein the alloy comprises a ductile phase and a nanoprecipitate hard phase.

2. The alloy as recited in claim 1, wherein at least 95 vol % of the alloy is characterized by a body-centered-cubic (BCC) crystalline phase.

3. The alloy as recited in claim 1, wherein the nanoprecipitate hard phase occupies approximately 0.01 vol % to approximately 0.1 vol % of the alloy; and wherein the nanoprecipitate hard phase comprises; the Fe and/or the Ti.

4. A composition of matter comprising the alloy as recited in claim 1, wherein the alloy is formed into a matrix having particles of a fuel dispersed throughout the matrix.

5. The composition of matter as recited in claim 4, comprising a plurality of pores dispersed throughout the matrix.

6. The composition of matter as recited in claim 4, comprising a metal cladding surrounding the matrix.

7. The composition of matter as recited in claim 6, comprising a metallic coating layer between the matrix and the metal cladding.

8. The alloy as recited in claim 1, wherein the alloy is characterized by a formula $Zr_xFe_yCu_zTa_a$, wherein:
   x is a value in a range from about 55 to about 95 wt %;
   y is a value in a range from about 2.5 to about 15 wt %;
   z is a value in a range from about 0.5 to about 5 wt %; and
   a is a value in a range from about 1 to about 3 wt %.

9. The alloy as recited in claim 1, wherein the alloy is characterized by a formula $Zr_xFe_yCu_zTa_aTi_b$; and wherein:
   x is a value in a range from 58.5 to 73 wt %;
   y is a value in a range from 10 to 20 wt %;
   z is a value in a range from 1.5 to 5 wt %;
   a is a value in a range from about 1 to about 3 wt %; and
   b is a value in a range from about 12 to about 20 wt %.

10. The alloy as recited in claim 1, wherein the alloy is characterized by a formula $Zr_xFe_yCu_zTa_aM^1_b$; and wherein:
    x is a value in a range from about 55 to about 95 wt %;
    y is a value in a range from about 2.5 to about 15 wt %;
    z is a value in a range from about 0.5 to about 5 wt %;
    a is a value in a range from about 1 to about 3 wt %;
    $M^1$ includes as least one additional constituent selected from: Ti, Nb and Be; and
    b is a value in a range from about 1 to about 20 wt %.

11. The alloy as recited in claim 1, wherein the alloy is characterized by a formula $Zr_xFe_yCu_zM^1_aTa_b$, wherein:
    x is a value in a range from about 55 to about 90 wt %;
    y is a value in a range from about 5 to about 15 wt %;
    z is a value in a range from about 0.5 to about 5 wt %;
    $M^1$ is selected from Ti, Nb and Be;
    a is a value in a range from about 1 to about 20 wt %; and
    b is a value in a range from about 1 to about 3 wt %.

12. The alloy as recited in claim 11, wherein:
    x is a value in a range from 66 to 85 wt %;
    y is a value in a range from 4 to 7 wt %;
    z is a value in a range from 1 to 3 wt %;
    $M^1$ is Ti or Nb; and
    a is a value in a range from 5 to 20 wt %.

13. A method of forming an inert matrix nuclear fuel, comprising:
    packing a hollow structure with fuel pellets and alloy precursor pellets;
    heating the fuel pellets and the alloy precursor pellets to at least a melting temperature of an alloy to be formed by melting the alloy precursor pellets; and
    solidifying the alloy into a matrix surrounding the fuel pellets;
    wherein the alloy comprises:
       Zr;
       Fe;
       Cu;
       Ta present in an amount from about 1 to about 3 wt %; and
       one or more optional alloy constituents selected from: Ti, Be, and Nb; and
    wherein the alloy comprises a ductile phase and a nanoprecipitate hard phase.

14. The method as recited in claim 13, wherein the melting temperature of the alloy is in a range from approximately 600° C. to approximately 950° C.

15. The method as recited in claim 13, wherein heating the alloy precursor pellets causes the alloy to coat the fuel pellets via capillary action.

16. The method as recited in claim 13, comprising forming a metallic coating layer of the alloy on interior surfaces of the hollow structure prior to packing the hollow structure.

17. The method as recited in claim 13, wherein approximately 95 vol % or more of the alloy is characterized by a body-centered-cubic (BCC) crystalline phase.

18. The method as recited in claim 13, wherein the solidified alloy forms a continuous matrix, the continuous matrix further comprising a plurality of pores.

19. The method as recited in claim 13, wherein the alloy is characterized by a formula $Zr_xFe_yCu_zTa_a$, where:
   x is a value in a range from about 55 to about 95 wt %;
   y is a value in a range from about 2.5 to about 15 wt %;
   z is a value in a range from about 0.5 to about 5 wt %; and
   a is a value in a range from about 1 to about 3 wt %.

20. The method as recited in claim 13, wherein the alloy is characterized by a formula $Zr_xFe_yCu_zM^1_aTa_b$, where:
   x is a value in a range from about 55 to about 90 wt %;
   y is a value in a range from about 5 to about 15 wt %;
   z is a value in a range from about 0.5 to about 5 wt %;
   $M^1$ is selected from Nb, Ti and Be;
   a is a value in a range from about 1 to about 20 wt %; and
   b is a value in a range from about 1 to about 3 wt %.

* * * * *